March 18, 1930.    G. BECKER    1,750,919
SUPERCHARGING METHOD FOR INTERNAL COMBUSTION ENGINES
Filed Aug. 28, 1928
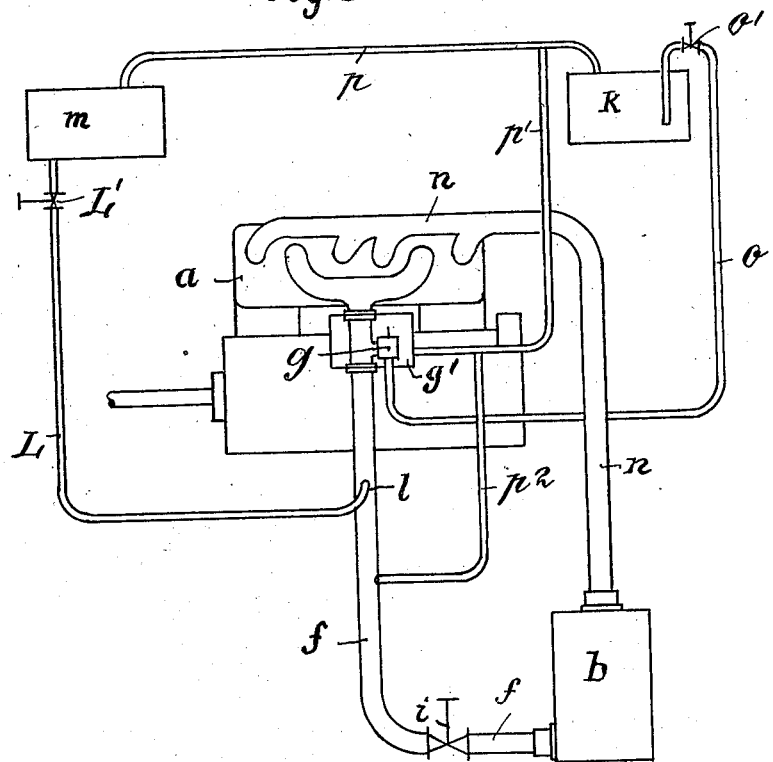
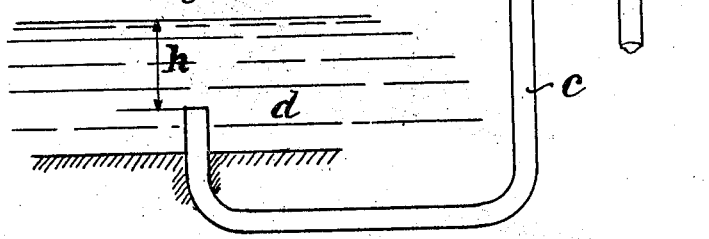
Inventor:
Gabriel Becker
by
Watson, Coit, Morse & Grindle
Attorneys.

Patented Mar. 18, 1930

1,750,919

UNITED STATES PATENT OFFICE

GABRIEL BECKER, OF CHARLOTTENBURG, GERMANY

SUPERCHARGING METHOD FOR INTERNAL-COMBUSTION ENGINES

Application filed August 28, 1928, Serial No. 302,577, and in Germany June 15, 1928.

The present invention relates to a supercharging method for internal combustion engines in which a portion of the exhaust gases are returned to the new charge for re-use as inert gases.

The method according to the invention, consists in throttling the outflow of the excess gases and thus causing the returned exhaust gases to flow at excess pressure into the combustion chambers of the cylinders. By the throttling the loading pressure and thus the charge and also the output of internal combustion engines may be adjusted within wide limits. If for example the pressure of the returning gases is increased by one atmosphere then the load or the charge is more than doubled whilst the action of the increase in the counter-pressure of the exhaust gases on the engine output is insignificant. With this method the volumetric efficiency of the internal combustion engine can be increased within wide limits whilst omitting a preliminary compressor for the gases contained in the charge. As the exhaust gases used as inert gases in the charge amount to about 4/5 of the total quantity of gas in the charge, the new method also has considerable advantages if oxygen or an equivalent combustion supporting gas is supplied by a small auxiliary compressor in the form of gas.

Further details of the invention will be seen from the following description with reference to the accompanying drawing which shows an example of an arrangement for carrying the method into effect.

Fig. 1 illustrates diagrammatically an internal combustion engine having my invention applied thereto.

Fig. 2 illustrates one form of muffler which may be used in connection therewith.

The exhaust gases from an internal combustion engine $a$ are conducted by an exhaust pipe $n$ to a condenser and water separator $b$ in which the exhaust gases are cooled and the water vapour formed by the combustion is condensed. From the condenser $b$ an outflow pipe $c$ leads through a throttle member $e$ either into the atmosphere or for suitable purposes, for instance to muffle the noise of the explosions, into water $d$ which is at a level $h$. A return pipe $f$ includes a valve $i$ and leads to the mixer or carburetter $g$ of the internal combustion engine. When the throttle member $e$ is completely open the exhaust gases and the condensed water contained therein pass directly into the outflow pipe $c$. By operating the throttle member $e$ the free passage through the pipe $c$ can be reduced whereby an increase in pressure occurs in the outflow pipe and in the return pipe $f$ so that a portion of the exhaust gases flows through the return pipe $f$ under pressure into the mixer $g$. In this manner the charge is increased and the output of the internal combustion engine increased whilst the excess exhaust gases and the condensed water vapour pass out through the outflow pipe $c$. For the purpose of equalizing the pressure in the various parts of the internal combustion engine illustrated in the drawing by way of example, the carburetter or mixer $g$ is mounted in a closed chamber $g^1$. The fuel tank $k$ is connected to the mixer or carburetter $g$ by a pipe $o$ having a controlling member such as the valve $o^1$. For the equalization of pressure the fuel tank $k$ is connected to the oxygen container $m$ by a pipe $p$ from which a branch pipe $p^1$ leads to the chamber $g^1$. The pipe $p^1$ is also provided with a branch pipe $p^2$ leading to the pipe $f$ at a point in advance of the point $l$ at which the pipe L provided with the control member $L^1$ supplies oxygen or the like into exhaust gases passing through the pipe $f$. The pipe $p^2$ could also be connected to the pipe $n$, through which the exhaust gases pass from the cylinders to the condenser $b$ for the same purposes. The oxygen is contained in the container $m$ under pressure either by automatically loading the container or by connecting it to the exhaust pipe $n$ or the return pipe $f$. The oxygen may be in any suitable form.

In cases of a considerable counter pressure in the outflow pipe $c$, for example by reason of high level $h$ of water $d$, the pressure can be adjusted by means of the valve $i$ in the return pipe $f$. By means of the two valves $e$ and $i$ the pressure of the gases can be adjusted at such a degree as to prevent the water $d$ from passing into the exhaust pipe.

I claim:—

1. The method of supercharging internal combustion engines which comprises returning a portion of the exhaust gases from the engine to the combustion chamber under pressure derived directly from the exhaust pressure, and introducing fuel and oxygen under pressure into the returning exhaust gases.

2. The method of supercharging internal combustion engines which comprises permitting a portion only of the exhaust gases from an engine to escape, returning the remaining portion of such gases to the combustion chamber under a pressure determined by the rate of escapement of the gases.

3. In apparatus for supercharging an internal combustion engine having exhaust and inlet conduits, the combination with means in said exhaust conduit for throttling the exhaust gases to control the escape thereof, of a conduit connecting said inlet conduit with said exhaust conduit intermediate the engine and said means whereby a portion of the exhaust gases are returned to the engine under pressure obtained by throttling, and means connected with said inlet conduit for introducing fuel and combustion supporting gas therein.

4. In apparatus for supercharging an internal combustion engine having exhaust and inlet conduits, the combination with means in said exhaust conduit for throttling the exhaust gases to control the escape thereof, of a conduit connecting said inlet conduit with said exhaust conduit intermediate the engine and said means whereby a portion of the exhaust gases are returned to the engine under pressure obtained by throttling, and means connected with said inlet conduit for introducing fuel and combustion supporting gas therein, and a connection to said inlet conduit in advance of the point of connection of said last named means thereto for supplying pressure to the fuel and combustion supporting gas.

GABRIEL BECKER.